(No Model.)
G. W. AINSWORTH.
CLOTHES POUNDER.
No. 500,461. Patented June 27, 1893.
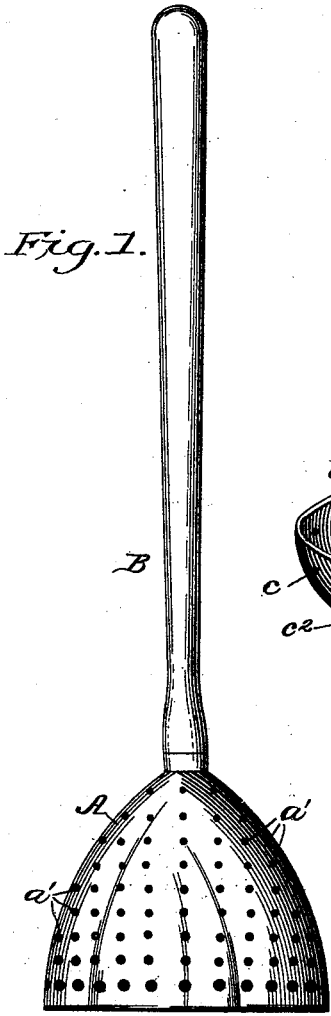
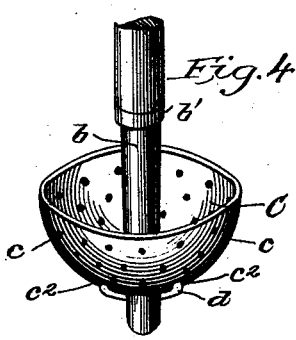
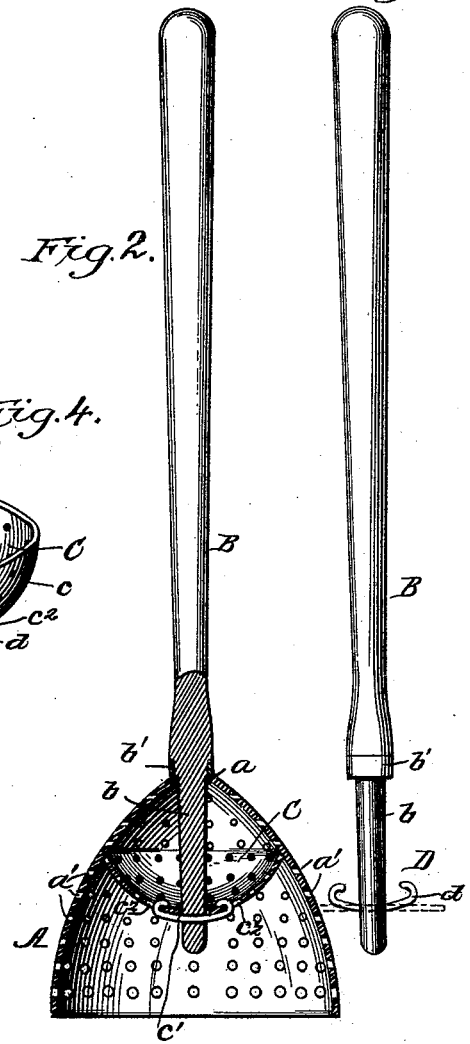
Witnesses.
J. H. Lucia
Geo. W. Wing
George W. Ainsworth, Inventor.

United States Patent Office.

GEORGE W. AINSWORTH, OF MONTPELIER, VERMONT.

CLOTHES-POUNDER.

SPECIFICATION forming part of Letters Patent No. 500,461, dated June 27, 1893.

Application filed February 23, 1892. Serial No. 422,579. (No model.)

*To all whom it may concern:*

Be it known that I, GEORGE W. AINSWORTH, residing at Montpelier, in the county of Washington and State of Vermont, have invented certain new and useful Improvements in Clothes-Pounders, of which the following is a specification.

My invention has for its object to provide a simple, inexpensive and effective clothes pounder, and it consists in the peculiar combination and arrangement of parts hereinafter described and claimed, reference being had to the accompanying drawings, in which—

Figure 1 is a side elevation of my improved clothes pounder. Fig. 2 is a vertical longitudinal section of the same. Fig. 3 is a detail view of the handle, and Fig. 4 is a perspective detail view of the inner funnel, and a portion of the handle.

My improved pounder comprises broadly an outer inverted funnel, an inner funnel or convex disk, and a handle connecting such funnels.

Referring now to the drawings A indicates the outer metallic perforated funnel, which has an opening $a$ in its top, to receive the lower end of the handle B, the walls of such funnel being straight or curved, preferably curved; the perforations $a'$ decreasing in size from the bottom to the top as shown.

Within the funnel A near its upper end is held a smaller funnel or convex disk C, which is also perforated as at $c$, and has a hole $c'$, in its lower end through which the lower end of the handle also passes, such funnel C being firmly held to the side walls of the funnel A, by solder or other suitable means.

The handle B has a tapering tenon $b$ at its lower end which passes through the holes $a$ and $c$ in the funnels A and C its shoulder $b'$ resting on the top of the outer funnel A. Near the lower end of its tenon portion, the handle is provided with a transverse rod or stiff wire D the ends of which form hook members $d\ d$. When the several parts are assembled, the tenon of the handle is passed through the holes $a$ and $c$ as before stated, and its lower end projected below the funnel C. The wire D is then passed through such tenon and its ends turned up and clinched into the apertures $c^2\ c^2$ in the funnel C as most clearly shown in Fig. 2.

From the foregoing description taken in connection with the drawings the advantages of my improvement will be readily apparent.

By arranging the two funnels in the manner described the same will effectually serve to quickly wash the clothes without danger of tearing them.

Having thus described my invention, what I claim, and desire to secure by Letters Patent, is—

1. An improved clothes pounder consisting of the conical shaped outer funnel A having an opening $a$ in its small or upper end, the inner inverted cup shaped perforated funnel C disposed near the upper end of the funnel A, and formed with an opening $c$ in its lower end, said funnel A having a series of perforations below the funnel C, the handle B, having a tenon passed through the openings $a$ and $c$ and means for securing the funnels A and C to hold them to their connected positions all substantially as shown and for the purposes described.

2. In combination, the inner and outer perforated funnels A and C arranged and constructed as described, each having an opening in its smaller end, the inner funnel having lock apertures $c^2$, of the handle B having a tenon $b$, which passes through the holes $a$ and $c$ and extends below the inner funnel C, the transverse wire D secured to such tenon, and having its ends bent and clinched in the lock apertures $c^2$ in the funnel C all arranged substantially as and for the purposes described.

GEORGE W. AINSWORTH.

Witnesses:
GEO. W. WING,
F. A. DWINELL.